UNITED STATES PATENT OFFICE.

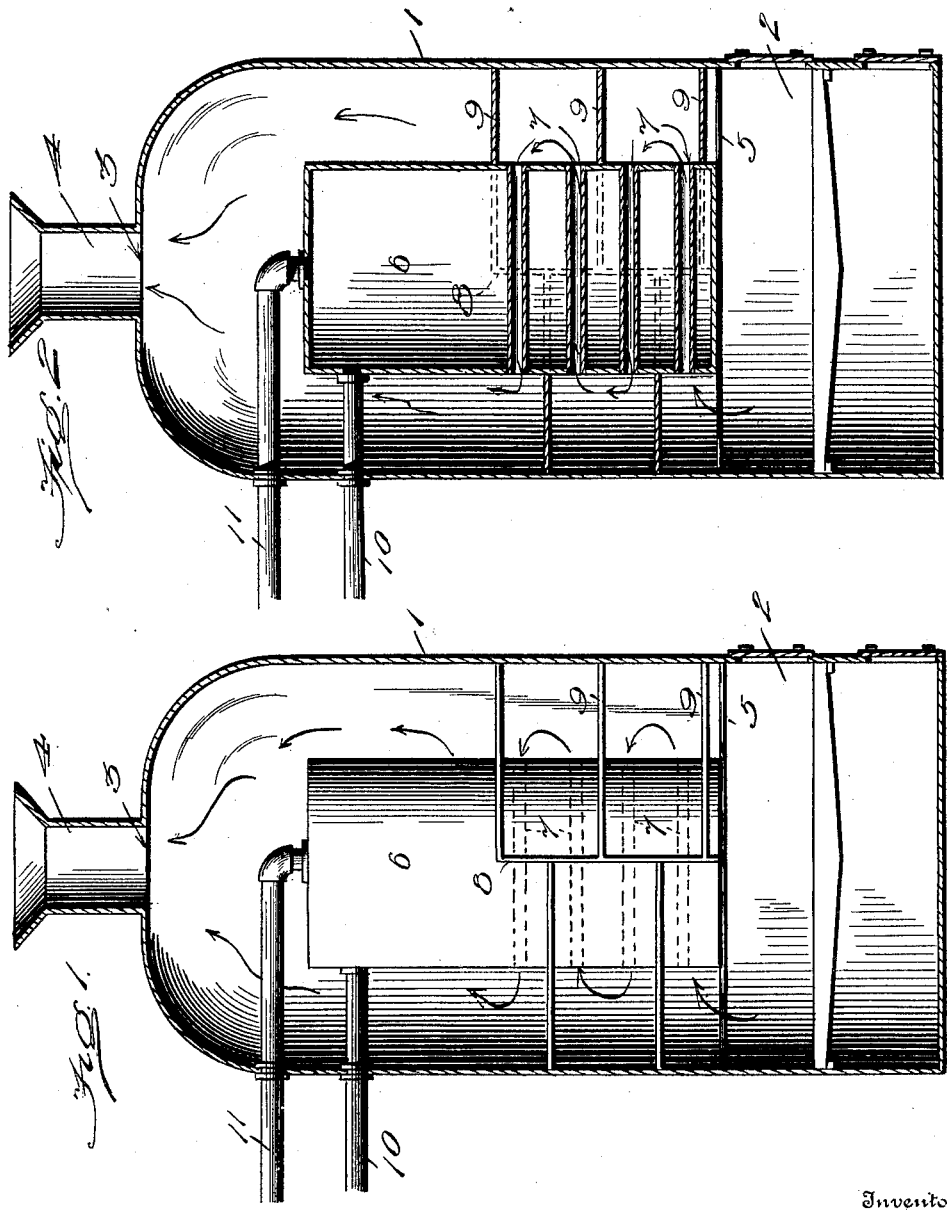

CHARLES DOBIAS, OF WESTLINE, MINNESOTA.

STATIONARY BOILER.

SPECIFICATION forming part of Letters Patent No. 686,804, dated November 19, 1901.

Application filed February 2, 1901. Serial No. 45,743. (No model.)

*To all whom it may concern:*

Be it known that I, CHARLES DOBIAS, a citizen of the United States, residing at Westline, in the county of Redwood and State of Minnesota, have invented new and useful Improvements in Stationary Boilers, of which the following is a specification.

My invention is an improvement in vertical stationary boilers.

The invention consists in the novel construction and combination of parts hereinafter more fully described and claimed, and illustrated in the accompanying drawings, showing the preferred form of my invention, and in which—

Figure 1 is a vertical section through the outer casing and showing the inner receptacle in elevation, and Fig. 2 is a vertical section through the complete device.

Referring to the figures by numerals of reference, 1 is a vertical cylindrical casing having a fire-box 2 at the lower end thereof, while an outlet 3 is arranged at the top and provided with suitable means, as a smoke-stack 4, for conveying away the products of combustion. Arranged within the casing and above the fire-box are transversely-extending rods 5, upon which is mounted a receptacle 6. This receptacle is preferably oblong in form, the lower portion thereof being provided with transversely-extending flues 7, arranged in series one above the other. Partitions 8 extend longitudinally of the receptacle 6 for a part of its length and are arranged upon opposite sides thereof. Semicircular partitions 9 are arranged on opposite sides of the vertical partitions 8 and fit snugly between the receptacle 6 and the inner surface of the casing 1. These partitions are so arranged between the flues as to direct the products of combustion from one flue into the other, as shown by arrows in Fig. 1. Suitable outlet-pipes 10 are arranged for conducting steam from the receptacle 6. Water is placed within the receptacle through an inlet-pipe 11, and the products of combustion passing from the fire upon the grate 2 will flow upward into the lower series of flues 7, the same being directed thereinto by the partition 9, located above said flues. The gases, &c., will then pass through these flues to the opposite side of the receptacle and will be returned through the adjacent flues arranged thereabove, and this back-and-forth movement will continue until the last series of flues has been passed, when the products of combustion will flow upward and around the receptacle 6 and through the outlet 3. It will be seen that the water within the receptacle and surrounding the flues 7 will be quickly heated by the hot gases passing through the flues and that portion of the water which is converted into steam will rise to the upper portion of the receptacle, where it will be superheated by the gases circulating around the receptacle and above the partitions 9. If desired, the flues 7 may be inclined in opposite directions, so as to facilitate passage of the hot gases therethrough.

Having thus fully described my invention, what I claim as new, and desire to secure by Letters Patent, is—

A vertical steam-boiler comprising a cylindrical casing having a fire-box at the lower end thereof, an outlet at the top and a smokestack connected with the outlet, the transversely-extending rods arranged above the fire-box, a cylindrical receptacle having a series of transverse flues arranged one above the other and seated on the rods, vertical partitions located on opposite sides of the receptacle, semicircular partitions arranged on opposite sides of the vertical partitions and alternating with the transverse flues of the receptacle, water-supply pipes extending through the side of the casing and connected with the top of the receptacle, and a steam-outlet pipe extending through the side of the casing beneath the water-supply pipe and connected with the receptacle beneath the top of the latter.

In testimony whereof I affix my signature in presence of two witnesses.

CHARLES DOBIAS.

Witnesses:
W. S. EASTMAN,
J. W. MORGAN.